United States Patent Office 2,934,449
Patented Apr. 26, 1960

2,934,449

MANUFACTURE OF PIGMENTED VISCOSE RAYON

Frederick B. Jones, Arden, N.C., assignor to American Enka Corporation, Enka, N.C., a corporation of Delaware No Drawing. Application May 24, 1957
Serial No. 661,298

11 Claims. (Cl. 106—165)

This invention relates to the manufacture of undelustered solution-colored cellulosic articles, such as filaments, threads, fibers and the like, from viscose and more particularly relates to the manufacture of said articles having improved physical appearance.

Prior to this invention, various methods have been devised to produce a solution-colored viscose rayon. Generally, it has been customary to incorporate one or more insoluble coloring pigments in the viscose solution prior to spinning. Yarns formed from such pigmented viscose solution possess remarkable resistance to fading.

The solution-colored rayon may or may not be lustrous, depending upon the method of manufacture. Ordinarily, a delustered yarn contains an insoluble inorganic pigment such as $TiO_2$ and/or an insoluble oil which is added at some stage in the production of the viscose. Although the present invention contemplates adding insoluble inorganic pigments to viscose, the addition is not made for the purpose of delustering as will become apparent hereinafter.

When the inorganic delustering agents were used in the art, they were used in amounts sufficient to provide for the production of low luster filaments; and, furthermore, they were not used for the purpose of the present invention.

Often in the production of lustrous solution-colored rayon an undesirable chromaticity difference is perceptible in the finished filaments. For example, when a plurality of closely spaced parallel filaments are viewed at different angles, noticeably different colors are observed.

These differences in color in the finished filaments are believed to result from inherent dichroism of the colored pigment particles in that anisotropic light absorption by the pigment crystals may result in different color perceptions, depending on the orientation of the light source and observer with respect to the optical axis of the crystal.

When these pigment crystals are incorporated in viscose and spun into filaments, they may become oriented along the fiber axis. This results in an undesirable dichroic effect in the filaments. The extent of this effect depends upon the degree of dichroism in the individual pigment particles and also the extent to which orientation occurs during spinning.

The present invention does not contemplate altering the inherent dichroism of the color pigments nor preventing orientation of the pigment particles. Rather, it has been found that the inclusion of very small amounts of inorganic pigments causes diffusion of both the incident and the reflected or transmitted light to such an extent that the undesirable color differences are not apparent. Furthermore, it has been found that minute amounts of well known pigments, that in larger amounts would deluster, are sufficient to accomplish this.

Therefore, it is an object of the present invention to provide a viscose spinning solution for the manufacture of lustrous solution-colored rayon filaments that do not exhibit dichroism.

Another object of the present invention is to provide a method for producing lustrous solution-colored viscose rayon filaments that do not exhibit dichroism.

These and other objects are accomplished according to the present invention by providing a viscose spinning solution prepared in the usual way, preparing a highly dispersed aqueous suspension of an inorganic pigment, adding a coloring material to the viscose solution in the amount necessary to impart a full color to the spun filaments and adding a sufficient amount of the pigment suspension to prevent dichroism but insufficient to deluster the filaments and thereafter extruding the viscose into a suitable coagulating bath.

By the introduction of the inorganic pigment in certain small amounts it was unexpectedly found that it is thus possible to prevent the problem of dichroism appearing in filaments of lustrous solution-colored rayon.

The present invention contemplates the use of insoluble inorganic pigments that are delustrants, such as $TiO_2$, either with or without bentonite, and $SnO_2$. Other pigments such as $BaSO_4$, $PbSO_4$ and $ZnO$ may be used. It is preferred that the delustrant be white or nearly white in order that it will not interfere to an undesirable extent with the coloring pigments employed.

It has been found that about 0.01–0.10% of the inorganic pigment by weight based on the cellulose content of the viscose, hereinafter referred to as % (CiV) give satisfactory results in most instances. However, it is to be understood that the invention is not restricted to any precise range since it is obvious that the proportions of the pigments may vary within wide limits depending on the pigment and the type of coloring material used. In any case, the amount of pigment may be easily determined by those skilled in the art; it is only necessary that the amount of pigment must be sufficient to prevent dichroism but insufficient to deluster the yarn.

The resulting colored cellulosic filaments have dispersed therethrough a coloring pigment and a small amount of an insoluble inorganic pigment. The procedure followed in the present invention does not appreciably result in lowering of the physical properties nor in subduing the luster of the filaments.

The present invention also contemplates forming a stable slurry of the inorganic pigment wherein it is uniformly dispersed in a liquid, for example, water. From this stable dispersion an appropriate aliquot may be conveniently withdrawn for mixing in a viscose solution.

More specifically, the powdered pigment, for example, $TiO_2$, is uniformly dispersed in water. Surprisingly, it has been found that the dispersion is considerably stabilized if a small amount of bentonite of the high swelling or western type is added.

For example, a water slurry of $TiO_2$ and bentonite may be ground in a pebble mill, a ball mill or a colloid mill such as a Charlotte mill with the resulting dispersion showing very little sedimentation after hours of standing. Bentonite not only acts as a stabilizer but also contributes to preventing dichroism in the spun filaments.

A suitable amount of inorganic pigment may be added to the viscose with the coloring pigments being added separately or the pigment may be added to the coloring pigments which in turn is added to the viscose either batchwise or injected by a suitable apparatus into a flowing stream of viscose prior to extrusion thereof into a conventional coagulating bath.

The effect of the addition of the pigment on dichroism may be seen in the following examples which are illustrative of the invention and are not to be construed as limiting the scope of the invention.

Example I

A viscose solution was prepared in the usual manner. The organic coloring pigments, Monastral Green in the amount of 0.11% (CiV) and Monastral Blue in the amount of 0.06% (CiV), were thoroughly mixed with the viscose, the green pigment being chlorinated copper phthalocyamine and the blue pigment being copper phthalocyamine. The pigmented viscose was extruded through a spinneret into an acid coagulating bath. After completing the aftertreatment of the filaments in a conventional manner, they were closely wound on a viewing card. A visual difference in the color of the filaments could be easily detected when the filaments were viewed at different angles. At a very flat viewing angle the yarn had a very distinct purple color instead of the desired color of blue-green.

In accordance with the practice of the present invention, an aqueous dispersion of 5% $TiO_2$ and 2% bentonite of the high swelling type containing about 90% montmorillonite was mixed for one hour in a ball mixing device. A predetermined portion of the dispersion was withdrawn and added to a coloring pigment suspension containing the same aforesaid coloring pigments. After thoroughly mixing, a predetermined amount of the resulting dispersion was added to a viscose solution prepared as above, the formulation being 0.140% (CiV) Monastral Green, 0.075% (CiV) Monastral Blue, 0.05% (CiV) $TiO_2$, and 0.019% (CiV) bentonite. The amount of pigment in the formulation was increased in order to offset the whitening effect of the $TiO_2$.

The pigmented viscose was extruded through the spinneret into the acid coagulating bath. The finished filaments so produced were closely wound on a viewing card. When the filaments were viewed at different angles, there were no detectably different surface color perceptions. The luster of the filaments was not noticeably changed. Furthermore, it was noted that the introduction of the $TiO_2$ and bentonite in the viscose did not affect the quality of threads produced.

Example II

Instead of mixing the suspension containing $TiO_2$, bentonite and coloring pigments batchwise to the viscose, the suspension was injected in metered amounts into a flowing stream of viscose. The viscose was thereafter spun into filaments. The filaments did not show dichroism. Also, the luster and physical properties of the yarn were not adversely affected by the addition of the $TiO_2$ and bentonite.

Example III

A yellow organic pigment, Yellow 3GL, in the amount of 1.0% (CiV) was thoroughly mixed with a viscose solution prepared in the usual manner. The pigmented viscose was extruded through a spinneret into an acid setting bath. After the filaments were aftertreated in the usual way, they were closely wound on a viewing card. The filaments exhibited dichroism.

To a suspension containing the same yellow pigment, $SnO_2$ was added. A portion of the suspension was added to a prepared viscose solution, the formulation being 0.10% $SnO_2$ (CiV) and 1.0% Yellow 3GL (CiV). The pigmented viscose was spun into filaments by the viscose process. The filaments, when examined on a viewing card, did not exhibit the undesirable dichroism. Also, the luster and physical properties of the yarn as compared with the yarn not containing the $SnO_2$ were substantially the same.

Although the invention has been described in terms of the specific embodiments, certain modifications and equivalents will be apparent to those skilled in the art and are intended to be included within the scope of the present invention, which is to be limited only to the extent of the appended claims.

What is claimed is:

1. A viscose spinning solution for the manufacture of lustrous solution-colored rayon filaments having dispersed therein an organic coloring pigment and containing a small amount of a substantially white inorganic delustering pigment, said small amount being sufficient to prevent dichroism but insufficient to deluster the spun filaments.

2. A solution according to claim 1 wherein the inorganic pigment is present in the amount of 0.01–0.10% by weight based on the cellulose.

3. A viscose spinning solution for the manufacture of lustrous solution-colored rayon filaments having dispersed therein an organic coloring pigment and containing $TiO_2$ in the range of 0.01–0.10% by weight based on the cellulose.

4. A viscose spinning solution for the manufacture of lustrous solution-colored rayon filaments having dispersed therein an organic coloring pigment and containing $SnO_2$ in the range of about 0.01–0.10% by weight based on the cellulose.

5. A viscose spinning solution for the manufacture of lustrous solution-colored rayon filaments having dispersed therein an organic coloring pigment and containing $TiO_2$ plus bentonite in the range of about 0.01–0.10% by weight based on the cellulose.

6. In the manufacture of lustrous solution-colored viscose rayon the steps comprising preparing a viscose spinning solution having an insoluble organic coloring pigment incorporated therein, preparing a highly dispersed suspension of a small amount of a substantially white inorganic delustering pigment, mixing the suspension with the spinning solution and spinning the mixture into filaments, said small amount being sufficient to prevent dichroism but insufficient to deluster the filaments.

7. In the manufacture of lustrous solution-colored viscose rayon the steps comprising preparing a highly dispersed aqueous suspension of a small amount of $TiO_2$, adding such suspension to a suspension of organic coloring pigment, mixing the resulting suspension with a viscose spinning solution and spinning the mixture into filaments, said small amount being sufficient to prevent dichroism but insufficient to deluster the filaments and said coloring pigment being present in a sufficient amount to impart a full color to the filaments.

8. A process according to claim 7 wherein the $TiO_2$ is present in the range of about 0.01–0.10% by weight based on the cellulose.

9. In the manufacture of lustrous solution-colored viscose rayon the steps comprising preparing a highly dispersed aqueous suspension of $TiO_2$ and bentonite, adding such suspension to a suspension of an organic coloring pigment, establishing a flowing stream of viscose, injecting the resulting suspension in metered amounts into the stream of viscose and spinning the viscose into filaments, said $TiO_2$ and bentonite being present in a small amount, said small amount being sufficient to prevent dichroism but insufficient to deluster and said coloring pigment being sufficient to impart a full color to the filaments.

10. A process according to claim 9 wherein the $TiO_2$ and bentonite are present in the range of about 0.01–0.10% by weight based on the cellulose.

11. In the manufacture of lustrous solution-colored viscose rayon the steps comprising preparing a highly dispersed aqueous suspension of an insoluble inorganic white delustering pigment, said suspension being stabilized by bentonite, adding such suspension to a suspension of an organic coloring pigment, establishing a flowing stream of viscose, injecting the resulting suspension in metered amounts into the stream of viscose and spinning the viscose into filaments, said inorganic pigment and bentonite being present in a small amount, said small amount being sufficient to prevent dichroism but insufficient to deluster and said coloring pigment being sufficient to impart a full color to the filaments.

References Cited in the file of this patent

UNITED STATES PATENTS

| | | |
|---|---|---|
| 2,366,047 | Nerlinger | Dec. 26, 1944 |
| 2,549,842 | Moser | Apr. 24, 1951 |
| 2,690,398 | Guertler et al. | Sept. 28, 1954 |
| 2,839,420 | Hay | June 17, 1958 |

FOREIGN PATENTS

| | | |
|---|---|---|
| 593,546 | Great Britain | Oct. 20, 1947 |